US007450910B2

(12) United States Patent
Aoki

(10) Patent No.: US 7,450,910 B2
(45) Date of Patent: Nov. 11, 2008

(54) NON-CONTACT POWER SUPPLY SYSTEM

(75) Inventor: Fumihiko Aoki, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 797 days.

(21) Appl. No.: 10/947,328

(22) Filed: Sep. 23, 2004

(65) Prior Publication Data

US 2005/0068009 A1 Mar. 31, 2005

(30) Foreign Application Priority Data

Sep. 30, 2003 (JP) ............................ 2003-339935

(51) Int. Cl.
*H04B 1/00* (2006.01)

(52) U.S. Cl. ........................ 455/69; 455/298; 455/41.1; 323/205; 446/140; 700/297

(58) Field of Classification Search ................ 455/41.1, 455/298, 572, 69; 700/297; 446/140; 323/205
See application file for complete search history.

(56) References Cited

U.S. PATENT DOCUMENTS 4,714,870 A * 12/1987 Nilsson ...................... 323/258
5,170,491 A * 12/1992 Murata ........................ 455/73
5,256,955 A 10/1993 Tomura et al.
5,293,400 A * 3/1994 Monod et al. ............... 375/219
5,353,434 A * 10/1994 Katayama ................... 713/400
5,418,353 A * 5/1995 Katayama et al. ........... 235/380
5,602,462 A * 2/1997 Stich et al. .................. 323/258
5,615,229 A * 3/1997 Sharma et al. .............. 375/259
5,640,312 A * 6/1997 Carroll .................... 363/21.07
5,654,881 A 8/1997 Albrecht et al.
5,733,313 A * 3/1998 Barreras et al. ............... 607/33
6,178,100 B1 * 1/2001 Kitano ........................ 363/19
6,323,566 B1 * 11/2001 Meier ........................ 307/10.2
6,427,065 B1 * 7/2002 Suga et al. ................. 455/41.1
6,573,707 B2 * 6/2003 Kiriyama et al. ....... 324/207.17
6,636,146 B1 * 10/2003 Wehoski .................... 340/10.4
6,683,765 B2 * 1/2004 Kanamori .................... 361/18
6,703,793 B2 * 3/2004 Kitano ....................... 315/224
6,903,945 B2 * 6/2005 Kitano .................... 363/21.01
6,952,167 B2 * 10/2005 Wakabayashi ........... 340/572.5

(Continued)

FOREIGN PATENT DOCUMENTS

JP 63-112198 A 5/1988

(Continued)

*Primary Examiner*—Yuwen Pan
*Assistant Examiner*—Amar Daglawi
(74) *Attorney, Agent, or Firm*—Nixon & Vanderhye, P.C.

(57) ABSTRACT

A power supply system capable of supplying power from a power transmitter to a power receiver in an electrically non-contact manner, in which a power transmission module is attached to the power transmitter and a power reception module is attached to the power receiver. The power transmission module has a plurality of transmission-side coils for transmitting power and a plurality of transmission-side switches for turning on/off operation of the transmission-side coils. The power reception module has a plurality of reception-side coils for receiving power, a plurality of reception-side switches for turning on/off operation of the reception-side coils and, further, has a determination circuit for performing control so as to operate any of the transmission-side coils and any of the reception-side coils in a combination realizing highest power transmission efficiency.

14 Claims, 9 Drawing Sheets

U.S. PATENT DOCUMENTS

| | | | | |
|---|---|---|---|---|
| 7,026,818 | B2 * | 4/2006 | Machida et al. | 324/322 |
| 7,046,526 | B2 | 5/2006 | Toda et al. | |
| 7,120,006 | B2 * | 10/2006 | Sekoguchi et al. | 361/230 |
| 7,212,414 | B2 * | 5/2007 | Baarman | 363/16 |
| 7,233,137 | B2 | 6/2007 | Nakamura et al. | |
| 2002/0014529 | A1 * | 2/2002 | Tanaka | 235/449 |
| 2003/0197598 | A1 * | 10/2003 | Hayashi | 340/310.07 |
| 2004/0113790 | A1 * | 6/2004 | Hamel et al. | 340/572.1 |
| 2005/0068019 | A1 * | 3/2005 | Nakamura et al. | 323/355 |

FOREIGN PATENT DOCUMENTS

| | | | |
|---|---|---|---|
| JP | 3-165013 | A | 7/1991 |
| JP | 3-235432 | A | 10/1991 |
| JP | 04-317527 | | 11/1992 |
| JP | 6-133476 | A | 5/1994 |
| JP | 9-65502 | A | 3/1997 |
| JP | 10-4688 | A | 1/1998 |
| JP | 10-097931 | | 4/1998 |
| JP | 10-257139 | A | 9/1998 |
| JP | 2001-016789 | | 1/2001 |
| JP | 2001-231186 | A | 8/2001 |
| JP | 2001-292535 | A | 10/2001 |
| JP | 2001-309579 | A | 11/2001 |
| JP | 2001-339327 | A | 12/2001 |
| JP | 2002-26778 | A | 1/2002 |
| JP | 2003-224937 | A | 8/2003 |

* cited by examiner

NON-CONTACT POWER SUPPLY SYSTEM

This application is based on Japanese Patent Application No. 2003-339935 filed on Sep. 30, 2003, the contents of which are hereby incorporated by reference.

BACKGROUND

1. Field of the Invention

The present technology relates to a system for supplying power to an electronic device or an electric device and, more particularly, to a power supply system suitable for an electronic device or an electric device of mobile devices such as a mobile phone, a notebook-sized personal computer, a digital camera, and an electronic toy.

2. Related Art and Other Considerations

FIG. 12 shows a conventional configuration example of a non-contact power supply system using magnetic coupling. A power transmitter 100 has a primary coil 101 for transmitting power and a positioning projection 102, and a power receiver 103 has a secondary coil 104 for receiving power and a positioning recess 105.

As shown in FIG. 12, the primary coil 101 and the secondary coil 104 face each other in one-to-one correspondence and power is transmitted by magnetic coupling. When the primary coil 101 and the secondary coil 104 are apart from each other, power transmission efficiency deteriorates. Consequently, the primary coil 101 and the secondary coil 104 are disposed as close as possible by providing a projection and a recess such as the positioning projection 102 and the positioning recess 105 or by providing a guide (not shown) for positioning the power transmitter 100 and the power receiver 103 so that power can be supplied in a state of high power transmission efficiency.

In another conventional configuration example, by housing a power receiver in a box, corresponding to a power transmitter, made of a magnetic material, power is supplied to the power receiver in a non-contact manner. Such a method is also disclosed in, for example, Japanese Patent Application Laid-Open No. H04-317527 (hereinafter, referred to as "patent document 1"). At the time of providing a secondary coil in a power receiver, to realize high power transmission efficiency, the secondary coil has to be disposed in a predetermined position in the power receiver with high precision. There is another conventional configuration to assure the precision, in which a coil bobbin for a secondary coil is formed integrally with the body of a power receiver or a chassis housed in the power receiver body. Such a method is disclosed in, for example, Japanese Patent Application Laid-Open No. H10-97931 (hereinafter, referred to as "patent document 2").

However, the conventional configuration example shown in FIG. 12 has a problem such that since the positional relation between the power transmitter 100 and the power receiver 103 is strictly limited and a spatial constraint is strong, the usability for the user is not good.

In the conventional configuration example of the patent document 1, the power receiver can be charged as long as it is housed in any position in the box. Therefore, it can be said that the positional relation between the power transmitter and the power receiver is less limited than that in the conventional configuration example of FIG. 12. However, the box itself has to be made of a magnetic material and, if the box is not closed, power cannot be effectively supplied. Consequently, the technique has a problem that the usability for the user is not good.

In the conventional configuration example disclosed in the patent document 2, the coil bobbin for the secondary coil is formed integrally with the body of the power receiver or the chassis housed in the power receiver body. Consequently, the positional relation between the secondary coil and the body of the power receiver can be maintained at relatively high precision. However, at the time of charging the power receiver, like the conventional configuration example shown in FIG. 12, a problem occurs such that the positional relation between the power transmitter having therein the primary coil and the power receiver is strictly limited.

SUMMARY

In view of the above circumstances, the present technology provides a power supply system capable of optimally supplying power in accordance with a positional relation between a power transmitter and a power receiver which are casually disposed close to each other by the user without caring much about the positional relation between them and without requiring a special material such as a magnetic material.

The present technology provides a power supply system capable of supplying power from a power transmitter to a power receiver in an electrically non-contact manner. This power supply system includes: a power transmission module attached to the power transmitter; and a power reception module attached to the power receiver, wherein the power transmission module includes a plurality of transmission-side coils for transmitting power, the power reception module includes a plurality of reception-side coils for receiving power, and any of the transmission-side coils and any of the reception-side coils are operated in a combination realizing highest power transmission efficiency.

With the configuration, non-contact power supply by magnetic coupling in the combination of the transmission-side coil and the reception-side coil realizing the highest power transmission efficiency can be performed according to the positional relation between the power transmitter attached to the power transmission module and the power receiver to which the power reception module is attached.

The present technology also provides a power supply system capable of supplying power from a power transmitter to a power receiver in an electrically non-contact manner. This power supply system includes: a power transmission module attached to the power transmitter; and a power reception module attached to the power receiver, wherein the power transmission module includes a plurality of transmission-side coils for transmitting power, a plurality of transmission-side switches for turning on/off operation of the transmission-side coils, respectively, and a transmission-side switch change-over circuit for selectively turning on one of the transmission-side switches, and the power reception module includes a plurality of reception-side coils for receiving power, a plurality of reception-side switches for turning on/off operation of the reception-side coils, respectively, a reception-side switch change-over circuit for selectively turning on one of the reception-side switches, a memory for recording a value of power energy received by each of the plurality of reception-side coils, and a determination circuit for outputting an instruction signal to the transmission-side switch change-over circuit and the reception-side switch change-over circuit so as to operate any of the transmission-side coils and any of the reception-side coils in a combination realizing the highest power transmission efficiency on the basis of the values of power energy recorded on the memory.

With the configuration, non-contact power supply by magnetic coupling in the combination of the transmission-side coil and the reception-side coil realizing the highest power transmission efficiency can be performed according to the positional relation between the power transmitter attached to the power transmission module and the power receiver to which the power reception module is attached.

For example, the power reception module may include a signal transmission coil for transmitting the instruction signal, and the power transmission module may include a signal reception coil for receiving the instruction signal.

Only by adding the same coil, a coil using the same core, or the like as the transmission-side coil or reception-side coil, the instruction signal output from the determination circuit can be transmitted in a non-contact manner to the transmission-side switch change-over circuit in the power transmission module. Thus, manufacture of the power supply system of the present technology is facilitated and the cost can be reduced.

For example, the signal transmission coil may be wound around a core around which one of the reception-side coils is wound, and the signal reception coil may be wound around a core around which one of the transmission-side coils is wound. Consequently, it becomes unnecessary to prepare dedicated cores for non-contact transmission of the instruction signal, so that the cost can be reduced.

For example, a lead wire may be provided between one end and the other end of at least one each of the plurality of reception-side coils and the plurality of transmission-side coils, the instruction signal may be transmitted in a part between one end or the other end of the reception-side coil for which the lead wire is provided and the lead wire, and the instruction signal may be received in a part between one end or the other end of the transmission-side coil for which the lead wire is provided and the lead wire. Consequently, it becomes unnecessary to prepare dedicated cores and dedicated coils for non-contact transmission of the instruction signal, so that the cost can be reduced.

For example, the power transmission module may have a sheet shape and flexibility. With the configuration, only by disposing/adhering the power transmission module in/to a cup-shaped vessel, a box of a rectangular shape, or the like which is not made of a special material, a power transmitter can be constructed.

For example, the power reception module may have a sheet shape and flexibility. With the configuration, the power reception module can be disposed or adhered so as to be along the shape of the power receiver having a flat surface, moreover, a curved surface or a three-dimensional shape. As a result, power can be optimally supplied irrespective of the shape of the power receiver.

For example, the power reception module has a sheet shape and flexibility and is attached to the power receiver so as to partially or completely cover the power receiver. With the configuration, non-contact power supply can be performed with the highest power transmission efficiency in accordance with the positional relation between the power transmitter and the power receiver irrespective of the shape of the power receiver.

For example, the power transmission module has a sheet shape and flexibility, the power reception module has a sheet shape and flexibility, the power transmitter includes a housing in which the power transmission module is adhered to or buried in a whole or part of an inner face, and the power reception module is provided inside the power receiver. With the configuration, only by disposing or putting the power receiver in the housing without caring the positional relation between the housing and the power receiver having therein the power reception module, the power receiver can receive power in the state optimum to the positional relation, that is, with the highest power transmission efficiency.

For example, the housing includes an openable/closable cover, and the housing may be shielded by being entirely or partially covered with a conductive material or made of a conductive material. With the configuration, electromagnetic noise and unnecessary radiation leaking to the outside of the housing is reduced and an adverse influence due to the electromagnetic noise exerted on an electronic device and the like on the outside of the housing can be suppressed.

For example, the memory may record the value of the power energy only when the value of power energy to be recorded is equal to or larger than a predetermined value. Consequently, time of recording information onto the memory and time of comparing the value of the power energy with the other values of the power energy and making determination can be shortened, and power supply can be started promptly.

For example, the power supply system may further include a notifying device for notifying the user of the power supply system of the power transmission efficiency. With the configuration, in the case of actually supply power, the user can recognize the power transmission efficiency.

For example, the power supply system may further include an input device for receiving a signal which makes the determination circuit output the instruction signal. Here, when the signal is received, the determination circuit determines a combination of any of the transmission-side coils and any of the reception-side coils realizing the highest power transmission efficiency and outputs the instruction signal to the transmission-side switch change-over circuit and the reception-side switch change-over circuit so as to operate the transmission-side coil and the reception-side coil in the combination realizing the highest power transmission efficiency. Consequently, when the positional relation between the power receiver and the power transmitter changes, by supplying a signal to the input device, power supply optimum to the present positional relation can be performed.

For example, when a state where the power transmission efficiency is equal to or lower than predetermined efficiency continues for a predetermined time or longer, the determination circuit determines a combination of any of the transmission-side coils and any of the reception-side coils realizing the highest power transmission efficiency and outputs the instruction signal to the transmission-side switch change-over circuit and the reception-side switch change-over circuit so as to operate the transmission-side coil and the reception-side coil in the combination realizing the highest power transmission efficiency. With the configuration, without requiring the user to pay attention to the power transmission efficiency during power supply, optimum power supply can be performed automatically according to the positional relation between the power receiver and the power transmitter.

For example, power transmitted from each of the plurality of transmission-side coils can be switched. With the configuration, optimum power supply can be performed in accordance with power receivers of different kinds and whose necessary supply powers are different from each other.

For example, as the power reception module, a plurality of power reception module are provided so as to be attached to a plurality of power receivers of which one is the power receiver, power can be supplied simultaneously to the plurality of power receivers, and the determination circuit of each of the power reception modules determines a combination of any of the transmission-side coils and any of the reception-side coils realizing the highest power transmission efficiency and outputs the instruction signal to the transmission-side switch change-over circuit and the reception-side switch change-over circuit so as to operate the transmission-side coil and the reception-side coil in the combination realizing the highest power transmission efficiency. With the configuration, the plurality of power receivers whose necessary powers are different from each other can be charged simultaneously in an optimum state.

DETAILED DESCRIPTION

First Embodiment

Figure 1:
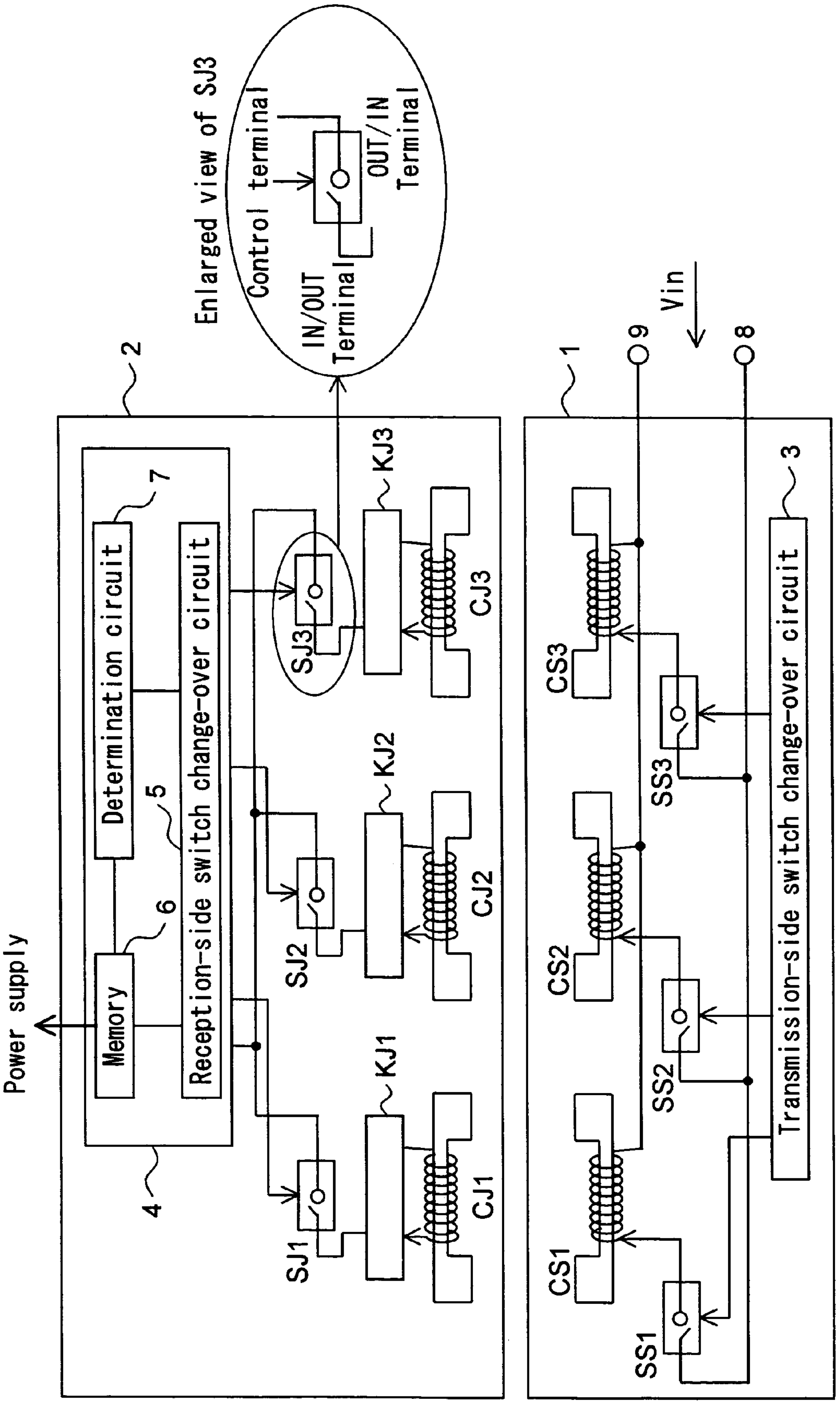
FIG. 1 is a circuit configuration diagram showing a first example embodiment of a power supply system.
Figure 2:
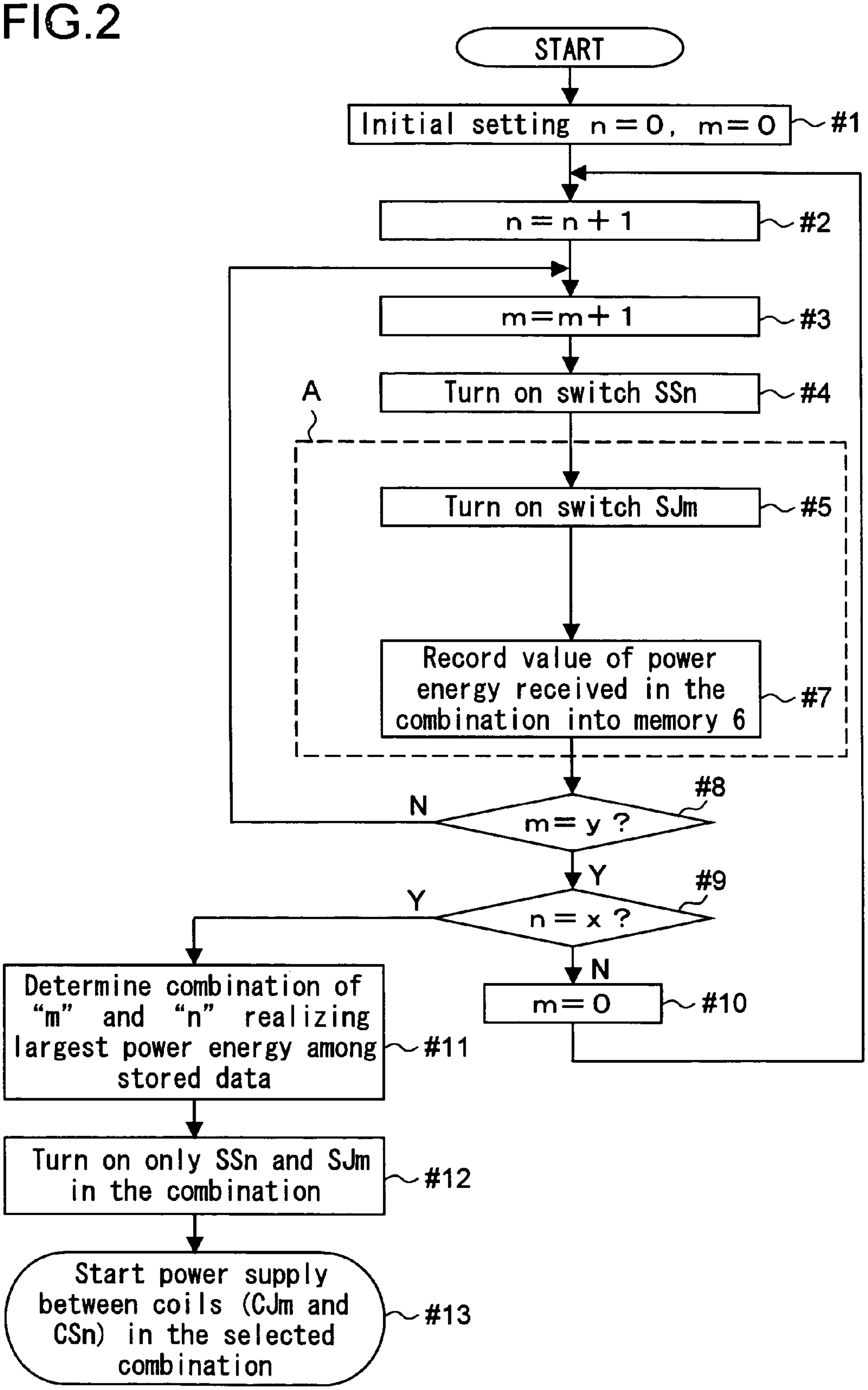
FIG. 2 is a flowchart showing operation of the power supply system of the first example embodiment.
Figure 3:
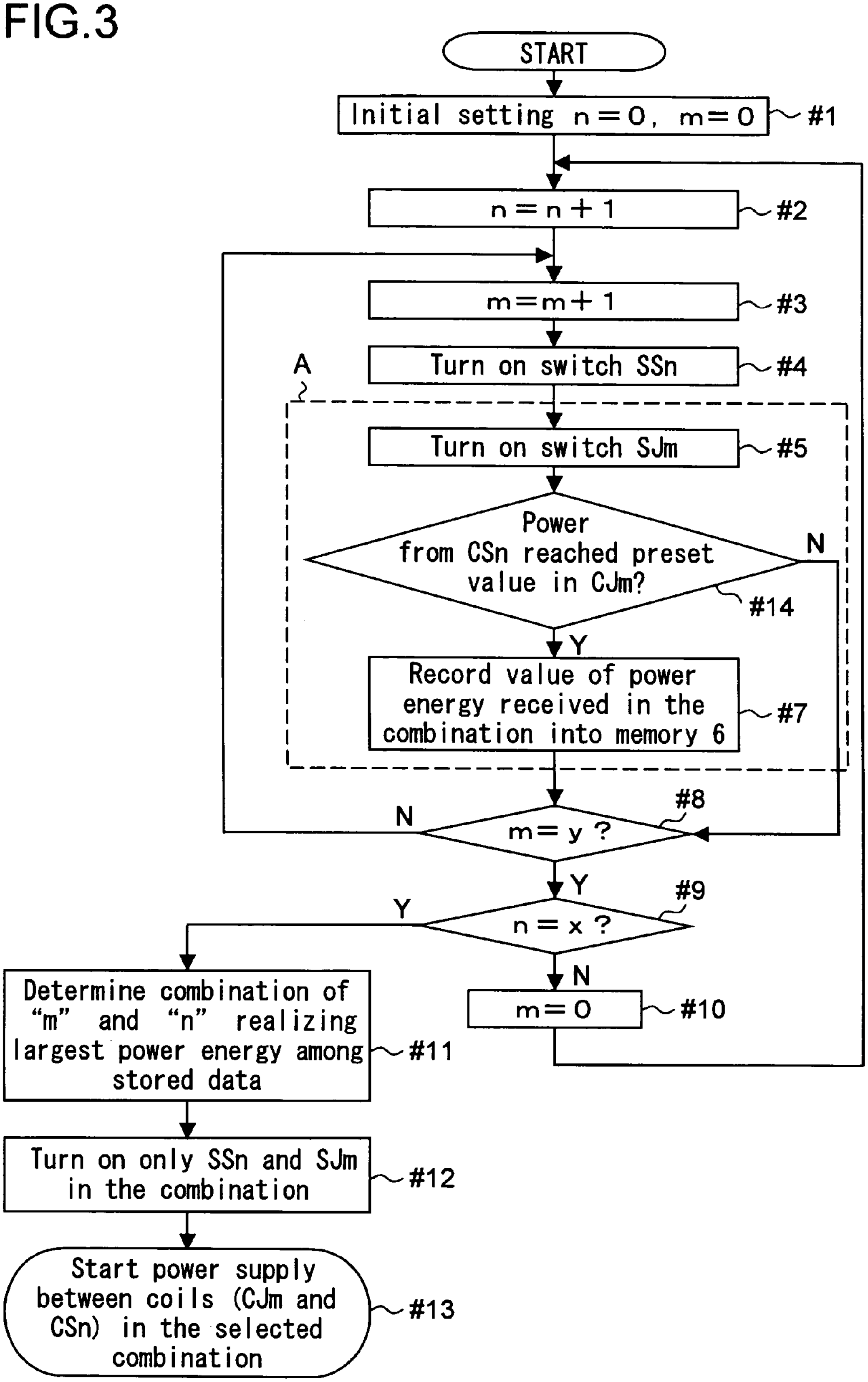
FIG. 3 is a flowchart showing operation of the power supply system of the first example embodiment.

A first example embodiment of a power supply system will be described below with reference to FIGS. 1 to 3. FIG. 1 is a circuit configuration diagram of a power supply system according to the first embodiment and FIGS. 2 and 3 are flowcharts of operations. A power supply system of the first embodiment can supply power from a power transmitter (not shown) on the transmission side to a power receiver (not shown) on the reception side in an electrically non-contact manner and has a power transmission module 1 attached to the power transmitter and a power reception module 2 attached to the power receiver.

The power transmitter is a device for transmitting power to a power receiver. The power receiver is an electric device capable of charging driving power and is a mobile phone, a notebook-sized personal computer, a digital camera, an electric shaver, an electronic toy, and the like.

The power transmission module 1 has power transmission coils CS1, CS2 and CS3, transmission-side switches SS1, SS2 and SS3, a transmission-side switch change-over circuit 3, and voltage input terminals 8 and 9. A voltage Vin is applied from the power transmitter across the voltage input terminals 8 and 9. The transmission-side coils CS1, CS2 and CS3 transmit power by magnetic coupling to any of reception-side coils CJ1, CJ2 and CJ3 which will be described later. The transmission-side switch change-over circuit 3 supplies signals for turning on/off part of or all of the transmission-side switches SS1, SS2 and SS3 to the transmission-side switches SS1, SS2 and SS3.

The voltage Vin is applied to the transmission-side coils CS1, CS2 and CS3 via the transmission-side switches SS1, SS2 and SS3, respectively. The transmission-side switches SS1, SS2 and SS3 are independently turned on/off on the basis of a signal from the transmission-side switch change-over circuit 3. When the transmission-side switch SS1 is ON, the voltage Vin is applied to the transmission-side coil CS1. When the transmission-side switch SS2 is ON, the voltage Vin is applied to the transmission-side coil CS2. When the transmission-side switch SS3 is ON, the voltage Vin is applied to the transmission-side coil CC3. The transmission-side coil CS1, CS2 or CS3 to which the voltage Vin is applied can transmit power to any of the reception-side coils CJ1, CJ2 and CJ3 which will be described later.

The power reception module 2 has the reception-side coils CJ1, CJ2 and CJ3, reception-side switches SJ1, SJ2 and SJ3, power detection circuits KJ1, KJ2 and KJ3, and a reception-side control circuit 4. The reception-side control circuit 4 has a reception-side switch change-over circuit 5, a memory 6, and a determination circuit 7. The reception-side coils CJ1, CJ2 and CJ3 receive power transmitted from the transmission-side coils CS1, CS2 and CS3 by magnetic coupling. The reception-side switch change-over circuit 5 supplies signals to turn on/off part of or all of the reception-side switches SJ1, SJ2 and SJ3 to the reception-side switches SJ1, SJ2 and SJ3. Each of the reception-side switches SJ1, SJ2 and SJ3 is turned on/off in accordance with a signal from the reception-side switch change-over circuit 5. When the reception-side switch SJ1 is ON, the reception-side coil CJ1 can receive power. When the reception-side switch SJ2 is ON, the reception-side coil CJ2 can receive power. When the reception-side switch SJ3 is ON, the reception-side coil CJ3 can receive power. The power is transmitted from any of the transmission-side coils CS1, CS2 and CS3.

As shown in an enlarged view of the reception-side switch SJ3 in FIG. 1, the reception-side switch SJ3 has two IN/OUT terminals and a control terminal. The other reception-side switches SJ1 and SJ2 and transmission-side switches SS1, SS2 and SS3 have a structure similar to that of the reception-side switch SJ3.

The power received by the reception-side coils CJ1, CJ2 and CJ3 is applied to the power receiver via the reception-side switches SJ1, SJ2 and SJ3 and the reception-side control circuit 4, thereby charging the power receiver. As a method that the power receiver receives power supply from the power reception module 2, a method of electrically connecting the power receiver and the power reception module 2 or a method of setting the power reception module 2 as a primary side, setting the power receiver as a secondary side, and receiving power supply in a non-contact manner by magnetic coupling may be employed.

The power detection circuits KJ1, KJ2 and KJ3 detect the power energy received by the reception-side coils CJ1, CJ2 and CJ3, respectively, and send the values of the power energy to the memory 6. The memory 6 stores the values of the power energy detected by the power detection circuits KJ1, KJ2 and KJ3 together with combination information of any of the transmission-side switches SS1, SS2 and SS3 and any of the reception-side switches SJ1, SJ2 and SJ3 which are turned on. The determination circuit 7 operates on the basis of information stored in the memory 6. The details of the operation will be described later. As the transmission-side switches SS1, SS2 and SS3 and the reception-side switches SJ1, SJ2 and SJ3, relay switches, transistors, and the like are used.

The operation of the power supply system of this embodiment will be described in detail by using the flowchart of FIG. 2. "The part A surrounded by broken lines" in FIG. 2 is a part different from the flowchart of FIG. 3 which will be described later. First, in step #1, variables "n" and "m" are set to 0 as initial values. After step #1, 1 is added to the variable "n" (step

#2), 1 is added to the variable "m" (step #3), and the program shifts to step #4 which will be described later.

In step #4, only a transmission-side switch SSn corresponding to the value of the variable "n" in the transmission-side switches SS1, SS2 and SS3 is turned on in accordance with a signal from the transmission-side switch change-over circuit 3 and the program shifts to step #5 which will be described later. For example, when "n"=1, only the transmission-side switch SS1 among the transmission-side switches SS1, SS2 and SS3 is turned on.

In step #5, only a reception-side switch SJm corresponding to the value of the variable "m" among the reception-side switches SJ1, SJ2 and SJ3 is selectively turned on in accordance with a signal from the reception-side switch change-over circuit 5. For example, when "n"=1 and "m"=2, only the transmission-side switch SS1 among the transmission-side switches SS1, SS2 and SS3 is turned on and the reception-side switch SJ2 among the reception-side switches SJ1, SJ2 and SJ3 is turned on. Consequently, carriage of power, specifically, transmission and reception of power is performed by magnetic coupling between the transmission-side coil CS1 and the reception-side coil CJ2. After step #5, the program shifts to step #7 which will be described later.

Before or after the carriage of power, by transmitting information indicating which one of the transmission-side switches SS1, SS2 and SS3 is currently turned on from any of the transmission-side coils CS1, CS2 and CS3 to any of the reception-side coils CJ1, CJ2 and CJ3 by magnetic coupling, the power reception module 2 can recognize which one of the transmission-side switches SS1, SS2 and SS3 is currently turned on. Since the reception module 2 can detect the information indicating which one of the transmission-side switches SS1, SS2 and SS3 is currently on even if the transmission efficiency is rather low, if any of the transmission-side coils CS1, CS2 and CS3 and any of the reception-side coils CJ1, CJ2 and CJ3 are close to each other enough to obtain practical power transmission efficiency, the information can be transmitted with reliability.

In step #7, the value of power energy detected by the power detection circuit KJm is recorded on the memory 6 together with the combination information of the transmission-side switch SSn and the reception-side switch SJm which are on. For example, in the case where "n"=1 and "m"=2, non-contact power supply is performed between the transmission-side coil CS1 and the reception-side coil CJ2, so that the value of power energy detected by the power detection circuit KJ2 with respect to the power received by the reception-side coil CJ2 is recorded together with the values of "n" and "m" at that time (n=1, m=2) on the memory 6. Hereinafter, the operations shown in steps #1 to #7 will be referred to as a "power supply level test".

In step #8 subsequent to step #7, whether the variable "m" is equal to the total number (3 in this embodiment) of the reception-side coils CJ1, CJ2 and CJ3 or not is determined. If the variable "m" is equal to the total number (Y in step #8), the program shifts to step #9 which will be described later. If the variable "m" is not equal to the total number (N in step #8), the program returns to step #3.

In step #9, whether the variable "n" is equal to the total number (3 in this embodiment) of the transmission-side coils CS1, CS2 and CS3 or not is determined. In the case where the variable "n" is equal to the total number (Y in step #9), that is, in the case where a power supply level test is conducted on all of combinations of the transmission-side coils CS1, CS2 and CS3 in the power transmission module 1 and the reception-side coils CJ1, CJ2 and CJ3 in the power reception module 2 as objects of the power supply level test, the program shifts to step #11. In the case where the variable "n" is not equal to the total number (N in step #9), the variable "m" is set to 0 (step #10) and, after that, the program returns to step #2.

In step #11, the determination circuit 7 determines a combination of "n" and "m" in which the value of power energy is the largest, that is, a combination of "n" and "m" in which the largest power is received because of the highest power transmission efficiency among the values of power energy recorded on the memory 6.

In step #12 subsequent to step #11, the transmission-side switch change-over circuit 3 outputs a signal to the transmission-side switch SSn and the reception-side switch change-over circuit 5 outputs a signal to the reception-side switch SJm so as to turn on the transmission-side switch SSn and the reception-side switch SJm corresponding to "n" and "m" determined in step #11.

At this time, the signal output from the reception-side switch change-over circuit 5 to the reception-side switch SJm is output in accordance with an instruction signal S output from the determination circuit 7 directly connected to the reception-side switch change-over circuit 5. A signal output from the transmission-side switch change-over circuit 3 to the transmission-side switch SSn is output in accordance with the instruction signal S transmitted from the determination circuit 7 to the transmission-side switch change-over circuit 3 in a non-contact manner.

In other words, in step #12, the determination circuit 7 directly gives the instruction signal S to the reception-side switch change-over circuit 5 and transmits the instruction signal S to the transmission-side switch change-over circuit 3 in a non-contact manner so that the transmission-side switch SSn and the reception-side switch SJm corresponding to "n" and "m" determined in step #11 are turned on.

As transmission means for transmitting the instruction signal S to the transmission-side switch change-over circuit 3 in a non-contact manner, not only the magnetic coupling method using any of the reception-side coils CJ1, CJ2 and CJ3 as a transmission side and any of the transmission-side coils CS1, CS2 and CS3 as a reception side, transmission means such as communication using infrared rays and wireless communication can be also employed.

After step #12, power supply is started between the transmission-side coil CSn and the reception-side coil CJm corresponding to "n" and "m" determined in step #11. Specifically, power is transmitted between the transmission-side coil CSn and the reception-side coil CJm in which the highest power transmission efficiency is obtained and charging of the power receiver attached to the power reception module 2 is started.

With the configuration of this embodiment, according to the positional relation between the power transmitter attached to the power transmission module 1 and the power receiver to which the power reception module 2 is attached, non-contact power supply by magnetic coupling is performed with a combination between any of the transmission-side coils CS1, CS2 and CS3 and any of the reception-side coils CJ1, CJ2 and CJ3 realizing the highest power transmission efficiency. Therefore, to supply power at high power transmission efficiency, it is sufficient for the user to casually dispose the power transmitter and the power receiver close to each other without caring much about the positional relation between the power transmitter and the power receiver. Thus, usability is very good.

A case in which power can be hardly supplied due to long distance between the coils is also assumed depending on a combination between any of the transmission-side coils CS1, CS2 and CS3 and any of the reception-side coils CJ1, CJ2 and CJ3 which are operating. In this case, information indicating that power cannot be supplied in the combination is recorded on the memory 6. The combination of "m" and "n" in which power cannot be supplied may be omitted from objects to be determined in determination of step #11. In such a manner, the determination time in step #11 can be shortened and power supply in step #13 can be started promptly.

Further, in this embodiment, the operation of the power supply system may be performed according to the flowchart shown in FIG. 3 in place of the flowchart shown in FIG. 2. The operation of this embodiment shown in the flowchart of FIG. 3 will be described in detail below. In FIG. 3, the same reference numerals are designated to the same parts as those in FIG. 2 and their description will not be repeated. FIG. 3 is different from FIG. 2 only with respect to the "part A surrounded by the broken line" in FIGS. 2 and 3. Only this part will be described below.

In the operations shown in the flowchart of FIG. 3, after step #5, the program does not directly shift to step #7. First, the program shifts to step #14 and whether the value of the power energy detected by the power detection circuit KJm is larger than a preset value or not is determined. If so (Y in step #14), the program shifts to the step #7; otherwise (N in step #14), the program skips the step #7 and shifts to the above-described step #8.

The preset value is a threshold for determining whether or not power can be supplied at all in the combination of "n" and "m" and determining whether or not supply power even if the power transmission efficiency is low. Therefore, in the case where the value of the power energy detected by the power detection circuit KJm is equal to or lower than the preset value (N in step #14), it is determined that the power cannot be supplied at all or low power transmission efficiency dose not permit supply power, and the operation in step #7, that is, "recording of the value of the power energy received in the combination of "n" and "m" into the memory 6" is not performed. In step #11, the combination of "n" and "m" of the largest power energy is determined among "the values of power energy recorded on the memory 6", so that the combination of "n" and "m" in the case where the value of power energy detected by the power detection circuit KJm is equal to or lower than the preset value is not the object to be determined in step #11.

By adding the determination in step #14, time of recording of information on the memory 6 and the determination time in step #11 can be shortened. Thus, power supply shown in the step #13 can be promptly started.

In the operations of this embodiment shown in FIGS. 2 and 3, first, the transmission-side coil CSn to operate is fixed (n is fixed), the reception-side coil CJm to operate is sequentially changed (m is sequentially changed), after that, the transmission-side coil CSn to operate is changed, and the same operation is repeated. Obviously, it is also possible to fix the reception-side coil CJm to operate (fix m), sequentially change the transmission-side coil CSn to operate (sequentially change n), after that, change the reception-side coil CJm to operate, and repeat the same operation.

Second to fourth embodiments concretely showing the means for transmitting the instruction signal S output from the determination circuit 7 described in step #12 in FIG. 2 to the transmission-side switch change-over circuit 3 in a non-contact manner will be described.

Second Embodiment

Figure 4:
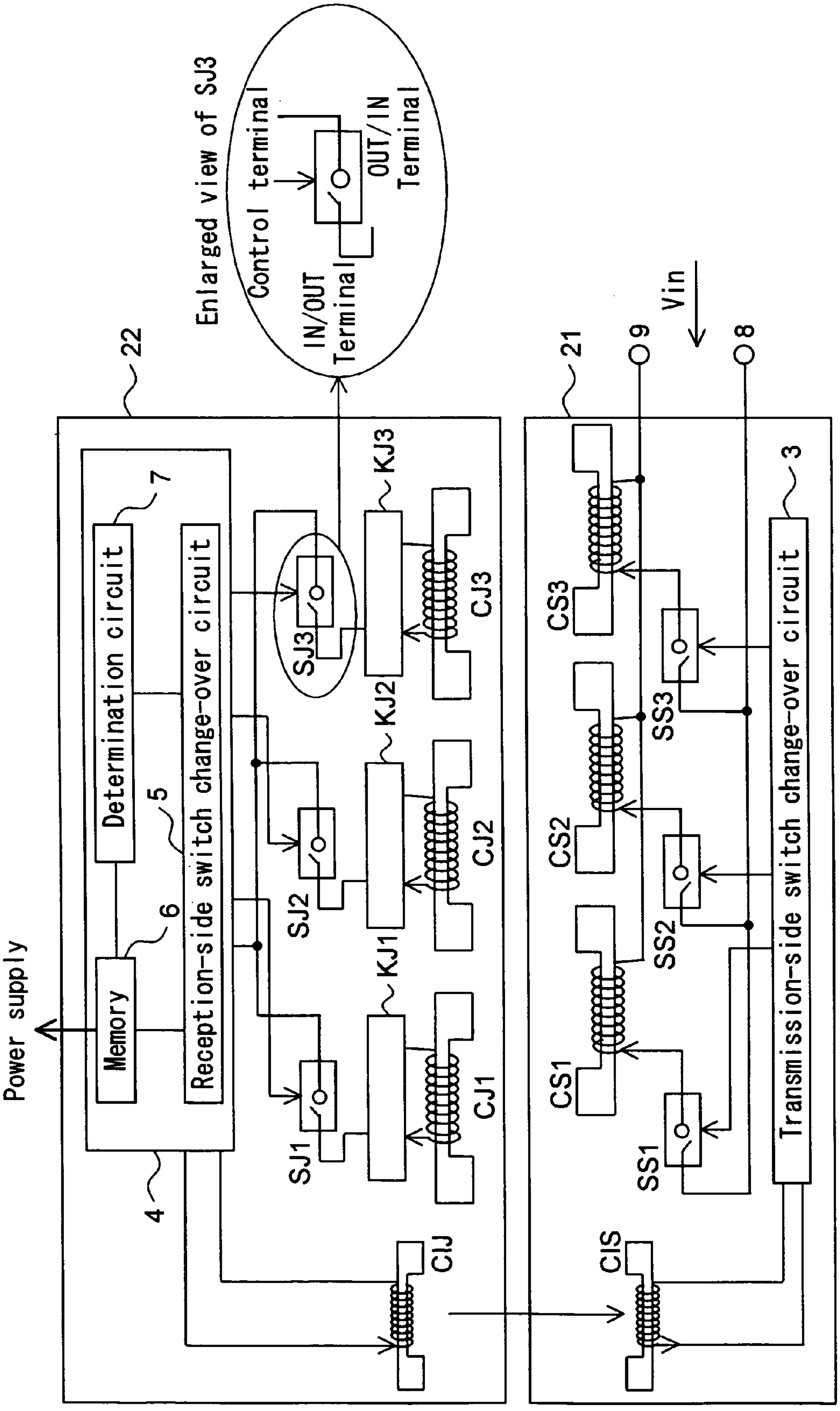
FIG. 4 is a circuit configuration diagram showing a second example embodiment of a power supply system.

First, a second example embodiment of a power supply system will be described with reference to FIG. 4. FIG. 4 is a circuit configuration diagram of the power supply system according to the second embodiment. The same reference numerals are designated to the same components as those in FIG. 1 and description of the operations and the like will not be repeated. The power supply system of the second embodiment is a power supply system capable of supplying power from a power transmitter (not shown) to a power receiver (not shown) in an electrically non-contact manner and has a power transmission module 21 attached to the power transmitter and a power reception module 22 attached to the power receiver. The operation of the power supply system of this embodiment is similar to that of the first embodiment described with reference to FIGS. 2 and 3.

The power transmission module 21 of the second embodiment is similar to the power transmission module 1 of the first embodiment except that a signal reception coil CIS is provided in addition to the transmission-side coils CS1, CS2 and CS3 for transmitting power. The signal reception coil CIS can receive a signal from a signal transmission coil CIJ which will be described later by magnetic coupling. The received signal is supplied to the transmission-side switch change-over circuit 3.

The power reception module 22 of this embodiment is similar to the power reception module 2 of the first embodiment except that the signal transmission coil CIJ is provided in addition to the reception-side coils CJ1, CJ2 and CJ3 for receiving power. The signal transmission coil CIJ can send a signal to the signal reception coil CIS by magnetic coupling and the signal to be transmitted is supplied from the determination circuit 7.

The signal transmission coil CIJ operates by electrically receiving the instruction signal S output from the determination circuit 7, thereby sending the instruction signal S by magnetic coupling. The instruction signal S sent from the signal transmission coil CIJ is received by the signal reception coil CIS by magnetic coupling and the instruction signal S is transmitted to the transmission-side switch change-over circuit 3.

With the configuration, only by adding the same coils as the transmission-side coils CS1, CS2 and CS3 or reception-side coils CJ1, CJ2 and CJ3 or coils using the same core, the instruction signal S output from the determination circuit 7 can be transmitted to the transmission-side switch change-over circuit 3 in the power transmission module 21 in a non-contact manner. Thus, manufacture of the power supply system of the present invention can be facilitated and the cost can be reduced.

Third Embodiment

Figure 5:
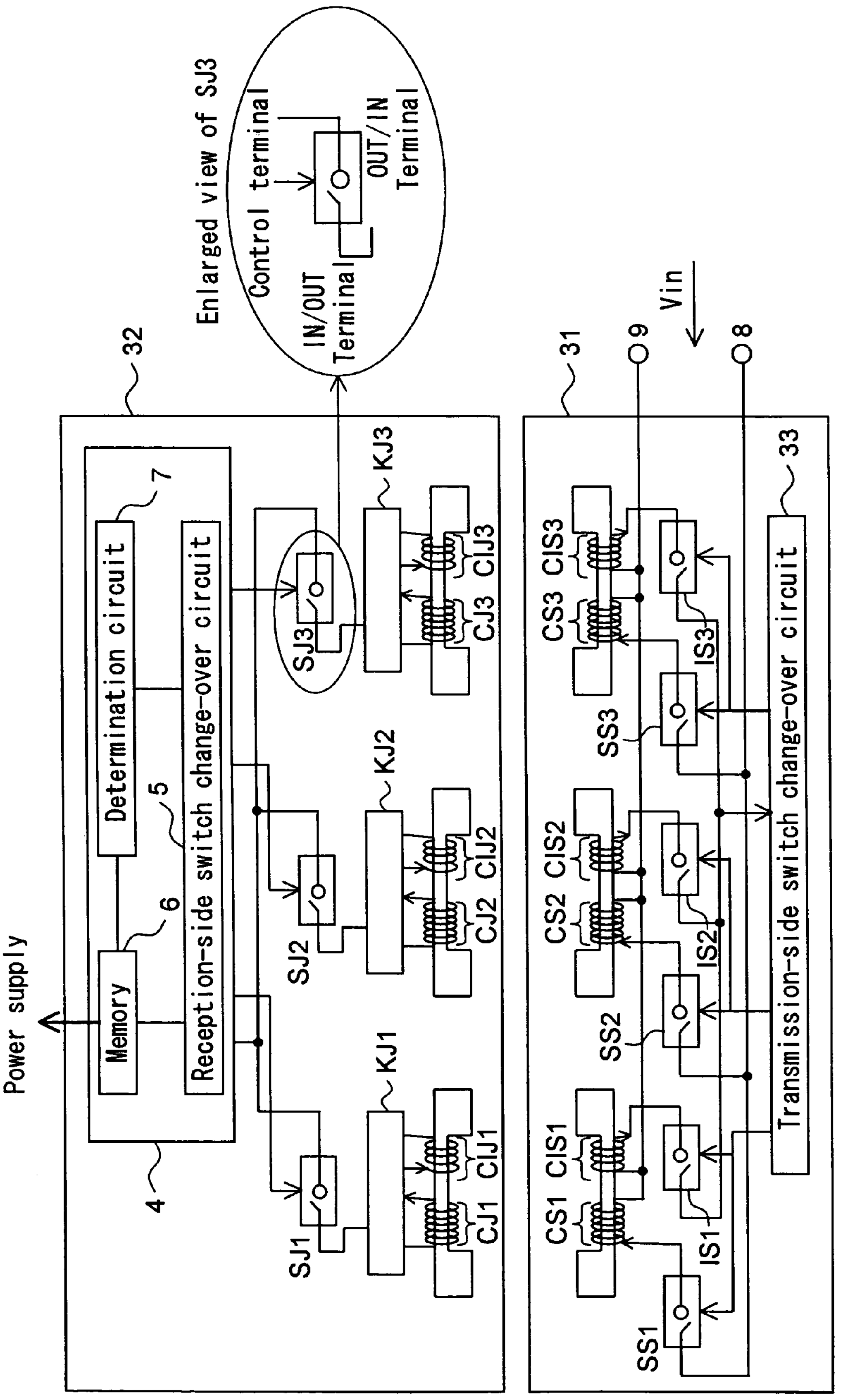
FIG. 5 is a circuit configuration diagram showing a third example embodiment of a power supply system.

A third example embodiment of a power supply system will now be described with reference to FIG. 5. FIG. 5 is a circuit configuration diagram of the power supply system according to the third embodiment. The same reference numerals are designated to the same components in FIG. 1 and the description of operations and the like will not be repeated. The power supply system of the third embodiment is a power supply system which can supply power from a power transmitter (not shown) to a power receiver (not shown) in an electrically non-contact manner, and has a power transmission module 31 attached to the power transmitter and a power reception module 32 attached to the power receiver. The operation of the power supply system of the third embodiment is similar to that of the first embodiment described with reference to FIGS. 2 and 3.

The power transmission module 31 has a transmission-side switch change-over circuit 33, signal reception coils CIS1, CIS2 and CIS3 and signal switches IS1, IS2 and IS3, and also has the transmission-side coils CS1, CS2 and CS3, the transmission-side switches SS1, SS2 and SS3, and the voltage input terminals 8 and 9 which are the same as those provided on the power transmission module 1 in the first embodiment. This configuration differs from that of the first embodiment in that the transmission-side switches SS1, SS2 and SS3 are turned on/off on the basis of a signal output from, not the transmission-side switch change-over circuit 3, but the transmission-side switch change-over circuit 33.

The signal reception coils CIS1, CIS2 and CIS3 can each receive a signal sent from any of the signal transmission coils CIJ1, CIJ2 and CIJ3 to be described later by magnetic coupling. The signal reception coils CIS1, CIS2 and CIS3 feed the thus received signals to the transmission-side switch change-over circuit 33 via the signal switches IS1, IS2 and IS3, respectively. The signal reception coils CIS1, CIS2 and CIS3 can receive signals when the signal switches IS1, IS2 and IS3 are on, respectively. The transmission-side switch change-over circuit 33 supplies signals to turn on/off part of or all of the transmission-side switches SS1, SS2 and SS3 and the signal switches IS1, IS2 and IS3 The transmission-side switch change-over circuit 33 can turn on/off each of the transmission-side switches SS1, SS2 and SS3 and the signal switches IS1, IS2 and IS3 individually.

One end of each of the signal reception coils CIS1, CIS2 and CIS3 is connected to the switches IS1, IS2 and IS3, and all of the other ends of the signal reception coils CIS1, CIS2 and CIS3 are connected to the voltage input terminal 9. The signal reception coil CIS1 is wound around the core around which the transmission-side coil CS1 is also wound, the signal reception coil CIS2 is wound around the core around which the transmission-side coil CS2 is also wound, and the signal reception coil CIS3 is wound around the core around which the transmission-side coil CS3 is also wound.

The power reception module 32 has the signal transmission coils CIJ1, CIJ2 and CIJ3, and also has the reception-side coils CJ1, CJ2 and CJ3, the reception-side switches SJ1, SJ2 and SJ3, and the reception-side control circuit 4 which are the same as those provided on the power reception module 2 in the first embodiment. The reception-side control circuit 4 has the reception-side switch change-over circuit 5, the memory 6, and the determination circuit 7 in a manner similar to the first embodiment.

Each of the signal transmission coils CIJ1, CIJ2 and CIJ3 can each transmit a signal to any of the signal reception coils CIS1, CIS2 and CIS3 by magnetic coupling, and receive such signals from the determination circuit 7 via the reception-side switches SJ1, SJ2 and SJ3, respectively. The signal transmission coils CIS1, CIS2 and CIS3 can transmit the signal when the reception-side switches SJ1, SJ2 and SJ3 are ON, respectively.

In the case of transmitting the instruction signal S output from the determination circuit 7 to the transmission-side switch change-over circuit 33, part or all of the reception-side switches SJ1, SJ2 and SJ3 are turned on and part or all of the signal switches IS1, IS2 and IS3 in the power transmission module 31 are turned on, and the determination circuit 7 sends the instruction signal S to the signal transmission coils CIJ1, CIJ2 and CIJ3 to which the instruction signal S is enabled to be transmitted since the reception-side switches SJ1, SJ2 and SJ3 are turned on. For example, if the reception-side switch SJ1 and the signal switch IS2 are ON, information of the instruction signal S is transmitted between the signal transmission coil CIJ1 and the signal reception coil CIS2 by magnetic coupling and is sent to the transmission-side switch change-over circuit 33.

As described above, in the third embodiment, it is unnecessary to prepare a dedicated core to perform non-contact transmission of the instruction signal S, so that the cost can be reduced.

Fourth Embodiment

Figure 6:
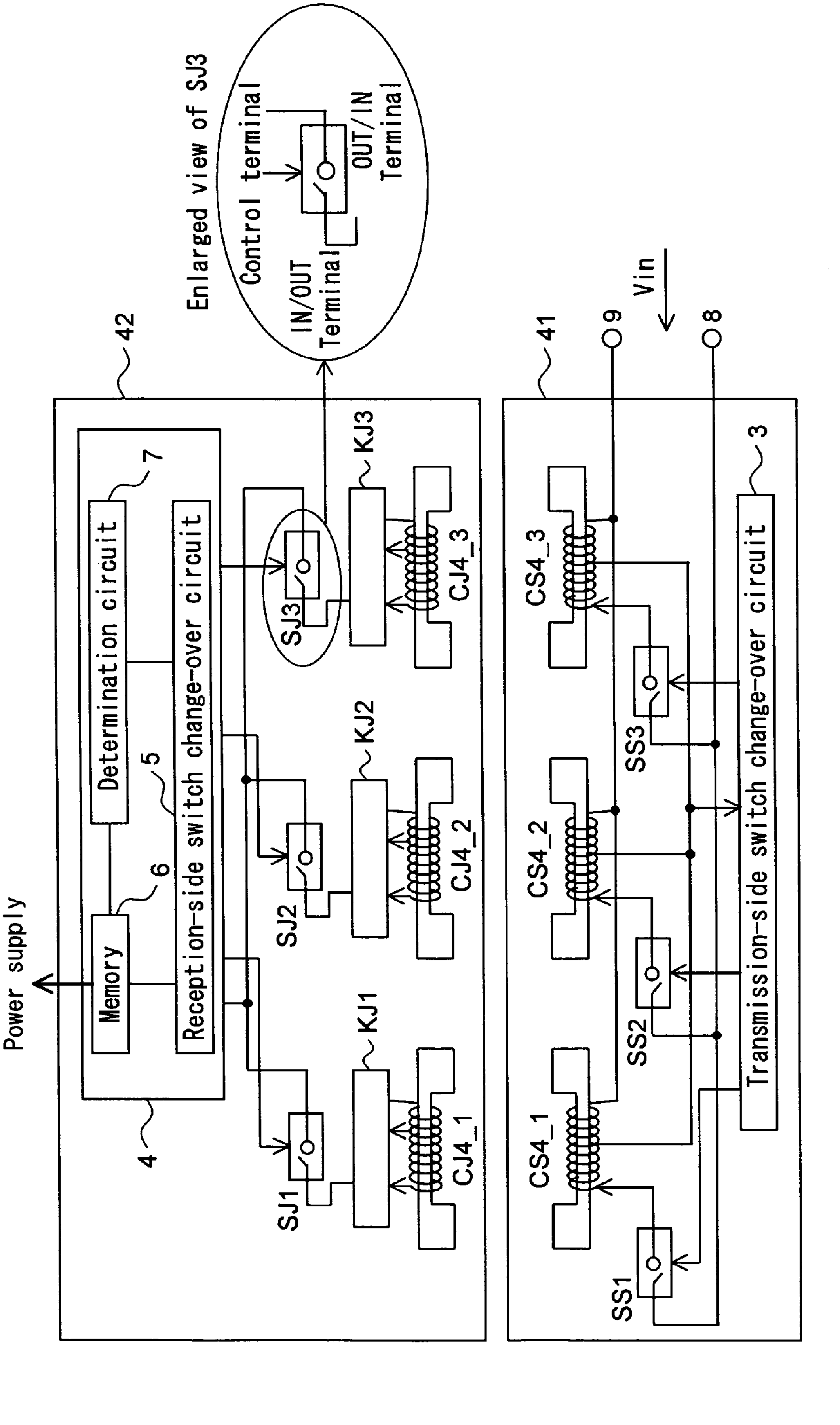
FIG. 6 is a circuit configuration diagram showing a fourth example embodiment of a power supply system.

A fourth example embodiment of a power supply system will now be described with reference to FIG. 6. FIG. 6 is a circuit configuration diagram of the power supply system according to the fourth embodiment. The same reference numerals are designated to the same components as those in FIG. 1 and the description of operations and the like will not be repeated. The power supply system of the fourth embodiment is a power supply system which can supply power from a power transmitter (not shown) to a power receiver (not shown) in an electrically non-contact manner, and has a power transmission module 41 attached to the power transmitter and a power reception module 42 attached to the power receiver. The operation of the power supply system of the fourth embodiment is similar to that of the first embodiment described with reference to FIGS. 2 and 3.

The power transmission module 41 of the fourth embodiment is similar to the power transmission module 1 of the first embodiment except for the point that transmission-side coils CS4_1, CS4_2 and CS4_3 each having a lead wire between one end and the other end are provided in place of the transmission-side coils CS1, CS2 and CS3 for transmitting power and the point that all of the lead wires provided on the transmission-side coils CS4_1, CS4_2 and CS4_3 are connected to each other and also connected to the transmission-side switch change-over circuit 3. The lead wires provided on the transmission-side coils CS4_1, CS4_2 and CS4_3 are open except for the timing of transmitting information of the instruction signal S output from the determination circuit 7 in the power reception module 42 to be described later.

The power reception module 42 of the fourth embodiment is similar to the power reception module 2 of the first embodiment except for the point that reception-side coils CJ4_1, CJ4_2 and CJ4_3 each having a lead wire between one end and the other end are provided in place of the reception-side coils CJ1, CJ2 and CJ3 for receiving power and the point that a signal voltage corresponding to the instruction signal S output from the determination circuit 7 can be applied to a coil part between one end or the other end of the reception-side coil CJ4_1 and the lead wire of the same (hereinafter, this part will be referred to as "transmission coil part 1"), a coil part between one end or the other end of the reception-side coil CJ4_2 and the lead wire of the same (hereinafter, this part will be referred to as "transmission coil part 2"), and a coil part between one end or the other end of the reception-side coil CJ4_3 and the lead wire of the same (hereinafter, this part will be referred to as "transmission coil part 3") via the reception-side switches SJ1, SJ2 and SJ3, respectively.

Signal currents corresponding to the instruction signal S flowing in the lead wires provided on the reception-side coils CJ4_1, CJ4_2 and CJ4_3, respectively, are supplied via the reception-side switches SJ1, SJ2 and SJ3, respectively, and flow only when the reception-side switches SJ1, SJ2 and SJ3 are ON, respectively. The lead wires provided on the reception-side coils CJ4_1, CJ4_2 and CJ4_3 are open except for the timings of transmitting information of the instruction signal S output from the determination circuit 7 in the power reception module 42.

At the timing of transmitting the information of the instruction signal S output from the determination circuit 7 to the transmission-side switch change-over circuit 3, part or all of the reception-side switches SJ1, SJ2 and SJ3 are turned on to pass the signal current corresponding to the instruction signal S to the part or all of the transmission coil parts 1, 2 and 3. By the operation, the information of the instruction signal S is transmitted to the transmission-side switch change-over circuit 3 by magnetic coupling between, for example, the transmission coil part 1 and the coil part between one end or the other end of the transmission-side coil CS4_1 and the lead wire of the same. Obviously, in a manner similar to the transmission-side coil CS4_1, the transmission-side coils CS4_2 and CS4_3 can also send the instruction signal S to the transmission-side switch change-over circuit 3 by being magnetic-coupled with any of the transmission coil parts 1, 2 and 3.

As means for transmitting information of the instruction signal S output from the determination circuit 7 in the power reception module 42 to the transmission-side switch change-over circuit 3 in a non-contact manner, parts of the transmission-side coils CS4_1, CS4_2 and CS4_3 for power transmission are used for receiving the information of the instruction signal S and parts of the reception-side coils CJ4_1, CJ4_2 and CJ4_3 for power reception are used for transmitting information of the instruction signal S. Consequently, it becomes unnecessary to prepare a dedicated core and a dedicated coil for non-contact transmission of the instruction signal S. Thus, the cost can be reduced.

In the foregoing first to fourth embodiments, for convenience of description, the total number of the transmission-side coils (for example, the transmission-side coils CS1, CS2 and CS3) is set to 3. However, the total number may be an arbitrary plural number. Although the total number of the reception-side coils (for example, the reception-side coils CJ1, CJ2 and CJ3) is set to 3, it may be also an arbitrary plural number. The total number of the transmission-side switches SS1, SS2 and SS3 and other components varies according to the total number of the transmission-side coils and the reception-side coils.

Fifth Embodiment

Figure 7:
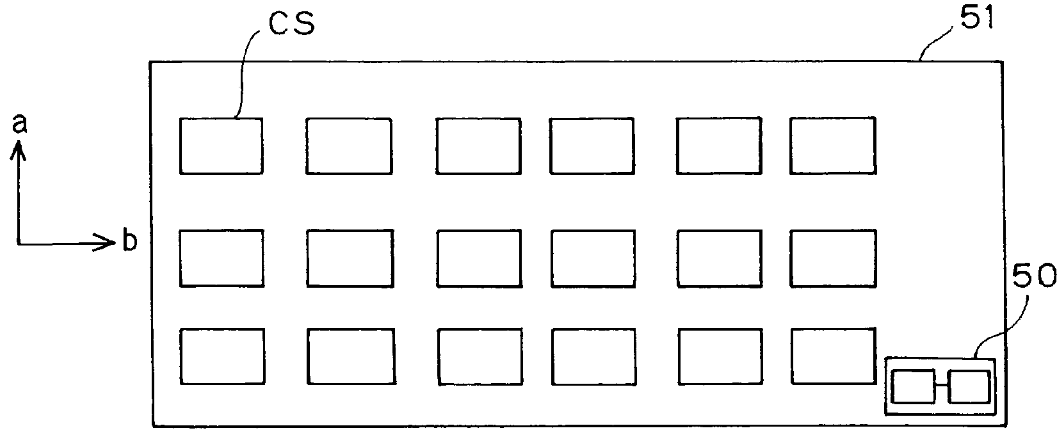
FIG. 7 is a plan view of a power transmission module of a fifth example embodiment.
Figure 8:
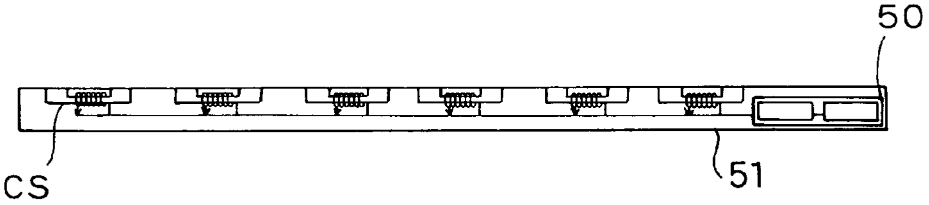
FIG. 8 is a sectional view of the power transmission module of the fifth example embodiment.
Figure 9:
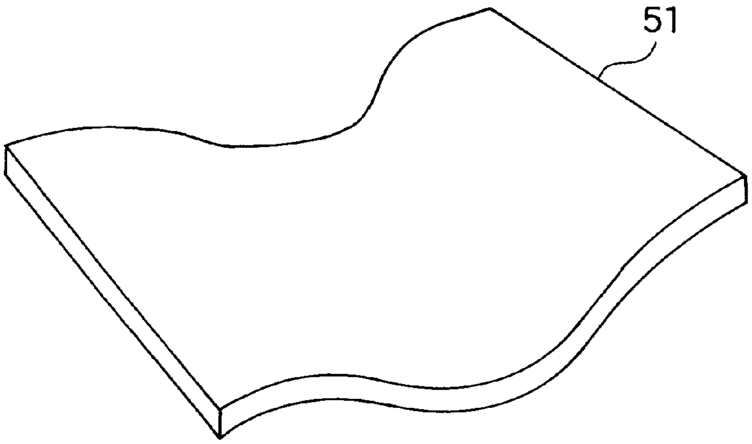
FIG. 9 is a perspective view showing flexibility of the power transmission module of the fifth example embodiment.

As a fifth embodiment, a power transmission module 51 which can be applied to the first to fourth embodiments will be described with reference to FIGS. 7 to 9. FIGS. 7 and 8 are a plan view and a sectional view, respectively, of the power transmission module 51 and FIG. 9 is a perspective view showing flexibility. As shown in FIG. 7, when directions "a" and "b" are set, there are a total of 18 transmission-side coils: three transmission-side coil CS in the direction "a" by six transmission-side coils CS in the direction "b" are provided on the power transmission module 51 shown in FIGS. 7 and 8. The interrelation among the 18 transmission-side coils CS are like that among the transmission-side coils CS1, CS2 and CS3 in FIG. 1. As shown in FIG. 8, the power transmission module 51 has a sheet shape which is thin in the direction perpendicular to the plane in which the transmission-side coils CS are provided.

The power transmission module 51 is similar to the power transmission module 1 (FIG. 1) in the first embodiment, the power transmission module 21 (FIG. 4) in the second embodiment, the power transmission module 31 (FIG. 5) in the third embodiment, and the power transmission module 41 (FIG. 6) in the fourth embodiment except for the shape and the number of transmission-side coils. The other configuration and operations of the power transmission module 51 are similar to those of the power transmission module 1, 21, 31 or 41.

A part 50 in FIGS. 7 and 8 indicates where there are provided components other than the transmission-side coils CS among the components provided on the power transmission module 51 (such as the transmission-side switch SS1 in FIG. 1). Although the configuration where the transmission-side coils CS and the part of the components other than the transmission-side coils CS are separated from each other is shown In FIGS. 7 and 8, the components other than the transmission-side coils CS may be disposed in a region close to the transmission-side coil CS if the power transmission module 51 is not prevented from being formed in a sheet shape.

As a board in which electronic circuits of the power transmission module 51 are disposed, a flexible board or the like formed by using a polyimide film or the like is employed and a casing of the power transmission module 51 is also constructed by using a resin or the like having flexibility. With the configuration, the whole power transmission module 51 has flexibility and, as shown in FIG. 9, the power transmission module 51 can be bent. Therefore, the power transmission module 51 can be disposed or adhered not only on a flat surface but also along the shape of an object having a curved surface or a three-dimensional shape. As a result, by disposing or adhering the power transmission module 51 to, for example, a cup-shaped vessel, a rectangular box, or the like which is made of a not-special material, a power transmitter can be constructed. Consequently, the power transmitter can be disposed in a small space and the space in which the power transmitter is disposed can be saved. Since a power transmitter of an any shape can be constructed, a power transmitter adapted to the demands of the user such as "portability", "ease of housing when not in use" and the like can be constructed and the usability for the user is improved.

Although the number of the transmission-side coils CS is 18 in the above description, obviously, it may be any plural number.

Sixth Embodiment

In a sixth embodiment, a power reception module which can be applied to the first to fourth embodiments (for example, the power reception module 2 in the first embodiment) will be described. In the fifth embodiment, attention is paid only to the power transmission module 51 and the power transmission module 51 having a sheet shape and flexibility has been described. Similarly, a power reception module 52 (not shown) having a sheet shape and flexibility may be constructed and applied to the first to fourth embodiments. Concretely, by replacing the power transmission module 51 with the power reception module 52 and replacing the transmission-side coil CS with a reception-side coil CJ (not shown), the power reception module 52 having a sheet shape and flexibility can be constructed.

The power reception module 52 is similar to the power reception module 2 (FIG. 1) in the first embodiment, the power reception module 22 (FIG. 4) in the second embodiment, the power reception module 32 (FIG. 5) in the third embodiment, and the power reception module 42 (FIG. 6) in the fourth embodiment except for the shape and the number of the reception-side coils. The other configuration and operation of the power reception module 52 are similar to those of the power reception module 2, 22, 32 or 42. Therefore, the operation of the power supply system having the power transmission module 51 and the power reception module 52 is similar to that shown in the flowchart of FIG. 2 or 3.

By forming the power reception module so as to have a sheet shape and flexibility, the power reception module 52 can be disposed or adhered not only on a flat surface but also along the shape of a power receiver having a curved surface or a three-dimensional shape. Thus, a power supply system which does not depend on the shape of the power receiver can be constructed. Specifically, only by casually disposing the power receiver to which the power reception module 52 is attached on or near the power transmission module 51, optimum power supply can be performed according to the positional relation between the power transmission module 51 and the power reception module 52, so that the flexibility of layout of the power receiver and the power transmitter increases and the spatial constraint for the user of the power supply system is eased. Obviously, the power reception module 52 may be attached to the power receiver so as to partially or completely cover the power receiver.

Seventh Embodiment

Figure 10:
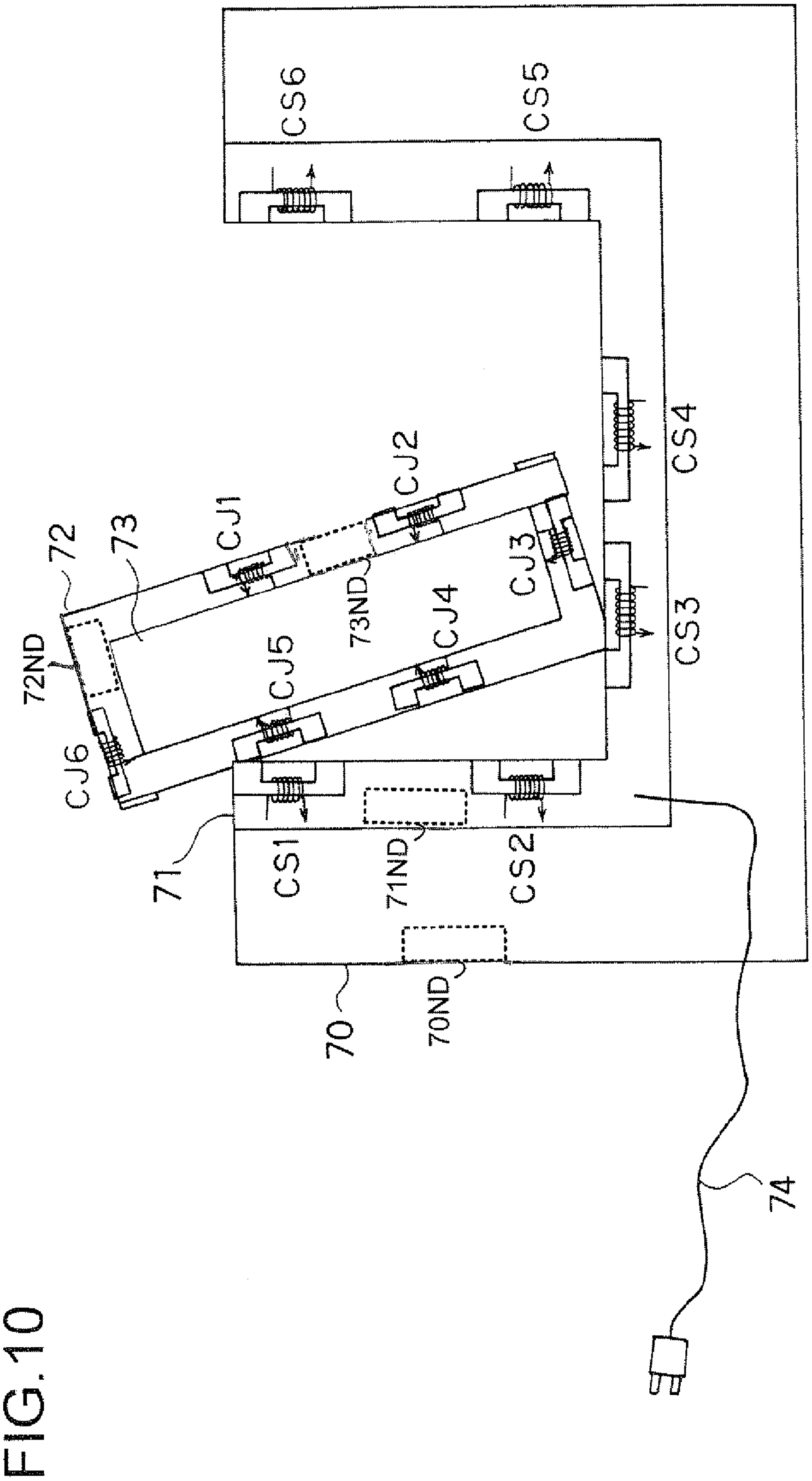
FIG. 10 is a schematic view showing a seventh example embodiment of a power supply system.

In a seventh embodiment, a power supply system obtained by combining the fifth and sixth embodiments will be described by referring to FIG. 10. FIG. 10 is a schematic view showing an example of the power supply system to which the seventh embodiment is applied. A power transmission box 70 is a hollow box having a rectangular parallelepiped shape and one of the faces of the transmission box 70 is open. "A power transmission module 71 having a sheet shape and flexibility" like the power transmission module 51 described in the fifth embodiment is disposed or adhered so as to be along the inner shape of the power transmission box 70.

The power transmission module 71 has total six transmission-side coils CS1 to CS6. In FIG. 10, the components (such as the transmission-side switch SS1 in FIG. 1) other than the transmission-side coils CS1 to CS6 in the power transmission module 71 are omitted but the power transmission module 71 has the components other than the transmission-side coils CS1 to CS6 in a manner similar to the power transmission module 1 in FIG. 1. The power transmission module 71 is similar to the power transmission module 51 in the fifth embodiment except for the shape and the number of transmission-side coils. The other configuration and operation of the power transmission module 71 are similar to those of the power transmission module 51.

The power transmission module 71 may be buried in the power transmission box 70. Obviously, the power transmission module 71 may be disposed, adhered, or buried on/in the inner face of the power transmission box 70 entirely or partially. In this case, the combination of the power transmission module 71 and the power transmission box 70 can be also regarded as the power transmitter in the power supply system of this embodiment.

The shape of the power transmission box 70 is not limited to a rectangular parallelepiped shape but may be any shape such as a cup shape having a curved surface as long as the power receiver can be housed or put. To the power transmission module 71, a power supply cord 74 having an AC plug which can be connected to an AC receptacle is connected. A commercial power supplied to the power supply cord 74 is a power source for charging a power receiver 73 which will be described below.

To the power receiver 73, a "power reception module 72 having a sheet shape and flexibility" like the power reception module 52 described in the sixth embodiment is disposed or adhered so as to be along the shape of the power receiver 73, and the power receiver 73 can be charged via the power reception module 72 as described in the other embodiments. The power reception module 72 is provided with total six reception-side coils CJ1 to CJ6. In FIG. 10, the components (for example, the reception-side switch SJ1 in FIG. 1) other than the reception-side coils CJ1 to CJ6 are omitted. However, like the power reception module 2 in FIG. 1, the power reception module 72 has the components other than the reception-side coils CJ1 to CJ6.

The power reception module 72 is similar to the power reception module 52 in the sixth embodiment except for only the shape and the number of reception-side coils and the other configuration and operation are similar to those of the power reception module 52. Therefore, the operation of the power supply system having the power transmission module 71 and the power reception module 72 is similar to that shown in the flowchart of FIG. 2 or 3.

As means by which the power receiver 73 receives power supply from the power reception module 72, the power receiver 73 and the power reception module 72 may be electrically connected to each other. Alternatively, the power reception module 72 is set as a primary side, the power receiver 73 is set as a secondary side, and power may be supplied in a non-contact manner by magnetic coupling. At the time of charging the power receiver, the power reception module 72 may be attached to the power receiver 73. Alternatively, the power reception module 72 may be previously provided inside the power receiver 73.

FIG. 10 shows a state where the power receiver 73 to which the power reception module 72 is attached is housed in the power transmission box 70 to which the power transmission module 71 is attached. In this case, among combinations of the transmission-side coils CS1 to CS6 and the reception-side coils CJ1 to CJ6, the distance between the transmission-side coil CS1 and the reception-side coil CJ5 is the shortest.

Therefore, when a power supply level test in the operation of the power supply system in FIG. 2 or 3 is conducted, it is determined that the combination of the transmission-side coil CS1 and the reception-side coil CJ5 realizes the highest power transmission efficiency (step #11 in FIG. 2 or 3). Thus, power supply is started between the transmission-side coil CS1 and the reception-side coil CJ5 (step #13 in FIG. 2 or 3).

As described above, only by disposing a power receiver like the power receiver 73 to which the power reception module 72 is attached in a vessel such as the power transmission box 70 in/on which the power transmission module 71 is partially or entirely adhered or buried without paying attention to the positional relation between the vessel and the power receiver (in FIG. 10, the power transmission box 70 and the power receiver 73), the combination between any of the transmission-side coils CS1 to CS6 and any of the reception-side coils CJ1 to CJ6 of the highest power transmission efficiency which is the optimum to the positional relation is automatically recognized and selected, and the power receiver is charged. With the configuration, the spatial constraint is eased and the usability for the user improves dramatically. It is obviously from the configuration of the present invention that the material of the vessel (power transmission box 70) is not limited to a special material such as a magnetic material but may be paper or a resin such as polycarbonate.

As described above, the power transmission box 70 has a box shape whose one face is open. An openable/closable or detachable cover may be provided on the open face. In the case where the cover is open or detached, a power receiver such as the power receiver 73 may be inserted or taken out. When the cover is closed or attached, the internal space of the power transmission box 70 is hermetically closed or closed from the outer space. The covered power transmission box 70 may be entirely or partially covered with a conductor such as a metal sheet and shielded. In place of covering the transmission box 70 with the conductor, the power transmission box 70 itself may be formed as a conductor made of metal or the like.

With the configuration, electromagnetic noise and unnecessary radiation leaking to the outside of the power transmission box 70 at the time of supplying power is lessened, and adverse influence due to the electromagnetic noise on electronic devices and the like on the outside of the power transmission box 70 can be lessened. When the power transmission box 70 having the power transmission module 71 is regarded as a vessel dedicated to charging, covering does not deteriorate usability for the user.

It is also possible to designate different identification signs to the plurality of power reception modules 72 (not shown) at the time of manufacture or by the user of the power supply system, and transmit the identification signs to the power transmission module 71 by using the "means for transmitting the instruction signal S" as described in the first to fourth embodiments. With the configuration, in the case where the plurality of power receivers 73 to each of which the power reception module 72 is attached are housed in the power transmission box 70, the power transmission module 71 can recognize that the plurality of power receivers 73 are housed (not shown) in the power transmission box 70 on the basis of the identification signs.

Each of the power reception modules 72 and the power transmission module 71 separately performs the operation shown in FIG. 2 or 3, thereby determining the combination of any of the transmission-side coils CS1 to CS6 and any of the reception-side coils CJ1 to CJ6 of the highest power transmission efficiency, and power is optimally supplied simultaneously to the power reception modules 72. As described above, by housing the plurality of power receivers 73 to each of which the power reception module 72 is attached in the power transmission box 70 to which the power transmission module 71 is attached, power can be optimally supplied simultaneously to the power receivers 73.

Eighth Embodiment

In an eighth embodiment, a power supply system which can be applied to any of the foregoing first to seventh embodiments will be described. The eighth embodiment will be described by taking the configuration of FIG. 10 as an example. The operation of the power supply system is performed as described above by referring to FIGS. 2 and 3, so that non-contact power supply by magnetic coupling is performed by a combination of any of the transmission-side coils CS1 to CS6 and any of the reception-side coils CJ1 to CJ6 of the highest power transmission efficiency in accordance with the positional relation between the power transmission box 70 to which the power transmission module 71 is attached and the power receiver 73 to which the power reception module 72 is attached.

In the eighth embodiment, a notifying device (not shown) for notifying the user of the power supply system of the present technology of the power transmission efficiency is provided. The notifying device is constructed by, for example, a level meter formed by an LED (Light Emitting Diode) or the like, a numerical value display, a speaker for notifying the user by sound, a terminal for outputting an electric signal, or the like. Other than the above level meter and the like, any device may be as long as it notifies the user of the power transmission efficiency.

It is sufficient to provide a notifying device 71ND for the power transmission module 71 or a notifying device 72N for power reception module 72. A notifying device 73N may be provided on the power receiver 73 in which the power reception module 72 is previously provided or a notifying device 70N may be provided on the power transmission box 70 to which the power transmission module 71 is adhered. In any case, it is sufficient to provide the notifying device (not shown) in any of the components of the power supply system.

With the configuration, in the case of actually supplying power, the user can recognize the power transmission efficiency. When the user wishes higher power transmission efficiency, the user can change the positional relation between the power receiver 73 to/in which the power reception module 72 is attached/provided and the power transmission box 70 to which the power transmission module 71 is attached so that higher power transmission efficiency is obtained. As a result, the power transmission efficiency is improved, the power receiver 73 can be charged in shorter time, and it also contributes to energy saving.

Ninth Embodiment

In a ninth embodiment, a power supply system which can be applied to any of the foregoing first to eighth embodiments will be described. The ninth embodiment will be described by taking the configuration of FIG. 10 as an example. In the ninth embodiment, in the configuration example of FIG. 10, a "power supply level test re-start button" (not shown) as an input device is provided on the power transmission module 71 or power reception module 72. The power supply level test re-start button is a button which can be turned on or off at any time by the user. In the power supply system of the present technology, by turning on/off the power supply level test re-start button during power supply, the power supply system starts the operation shown in FIG. 2 or 3 from step #1.

After the processes in steps #2 to #10, the determination circuit 7 determines the combination of any of the transmission-side coils CS1 to CS6 and any of the reception-side coils CJ1 to CJ6 of the highest power transmission efficiency at present (see step #11 in FIG. 2 or 3) and transmits the instruction signal S according to the determination result to the transmission-side switch change-over circuit (the transmission-side switch change-over circuit 3 or 33) and the reception-side switch change-over circuit (reception-side switch change-over circuit 5) (see step #12 in FIG. 2 or 3). Consequently, the power supply is restarted with the combination between any of the transmission-side coils CS1 to CS6 and any of the reception-side coils CJ1 to CJ6 of the highest power transmission efficiency at present.

The power supply level test re-start button may be provided on the power receiver 73 in which the power reception module 72 is previously provided or may be provided on the power transmission box 70 to which the power transmission module 71 is adhered. The power supply level test re-start button may be provided on any of the components of the power supply system. The power supply level test re-start button as an input device does not have to have a button shape but any input means such as a switch, an external input terminal, or the like may be employed as long as the user of the power supply system of the present technology can supply a signal to the power supply system.

For example, there may be a case such that the relative position between the power transmission module 71 and the power reception module 72 changes due to some accident or human-initiated failure during power supply and the combination between any of the transmission-side coils CS1 to CS6 and any of the reception-side coils CJ1 to CJ6 for actually transmitting/receiving power becomes not-optimum such as the case where power cannot be supplied.

In this case, the user turns on or off the power supply level test re-start button, thereby re-determining an optimum combination between any of the transmission-side coils CS1 to CS6 and any of the reception-side coils CJ1 to CJ6 in such a state and re-starting the optimum power supply in the determined combination. That is, optimum power supply is restarted. The user can also determine whether the power supply level test re-start button is turned on or off on the basis of the notification of the power transmission efficiency sent from the notifying device (not shown) as described in the eighth embodiment. As described above, the ninth embodiment can be combined with any of the first to eighth embodiments. For example, in the case of combining the ninth embodiment with the first embodiment, the power supply level test re-start button is provided on the power transmission module 1, power reception module 2 (see FIG. 1), or the like.

Tenth Embodiment

In a tenth embodiment, a power supply system which can be applied to any of the first to ninth embodiments will be described. The tenth embodiment will be described by using the configuration of FIG. 10 as an example. In the tenth embodiment, in the configuration example shown in FIG. 10, the power transfer efficiencies in combinations of the transmission-side coils CS1 to CS6 and the reception-side coils CJ1 to CJ6 actually transmitting/receiving power are measured all the time or at predetermined intervals during power supply. When the state where the power transmission efficiency becomes equal to or lower than predetermined efficiency continues for predetermined time or longer, in a manner similar to the case where the power supply level test re-start button is turned on or off in the ninth embodiment, the operation shown in FIG. 2 or 3 automatically starts from step #1.

After the processes in steps #2 to #10, the determination circuit 7 determines the combination between any of the transmission-side coils CS1 to CS6 and any of the reception-side coils CJ1 to CJ6 of the highest power transmission efficiency at present (see step #11 in FIG. 2 or 3) and transmits the instruction signal S according to the determination result to the transmission-side switch change-over circuit (the transmission-side switch change-over circuit 3 or 33) and the reception-side switch change-over circuit (the reception-side switch change-over circuit 5) (see step #12 in FIG. 2 or 3). Consequently, power supply re-starts with the combination of any of the transmission-side coils CS1 to CS6 and any of the reception-side coils CJ1 to CJ6 of the highest power transmission efficiency at present.

With the configuration, even if a case occurs such that the relative position between the power transmission module 71 and the power reception module 72 changes due to some accident or human-initiated failure, power cannot be supplied, and the combination between any of the transmission-side coils CS1 to CS6 and any of the reception-side coils CJ1 to CJ6 for actually transmitting/receiving power becomes not-optimum, the optimum combination between any of the transmission-side coils CS1 to CS6 and any of the reception-side coils CJ1 to CJ6 is automatically selected again and the optimum power supply restarts without paying attention to the power transmission efficiency during power supply. The predetermined efficiency and the predetermined time may be fixed values or means by which the user can always set those values may be provided on the power supply system of the present technology.

The tenth embodiment can be combined with any of the first to ninth embodiments. For example, in the case of combining the tenth embodiment with the first embodiment, it is sufficient to assume that the transmission-side coils CS1 to CS3 correspond to the transmission-side coils CS1 to CS6 and that the reception-side coils CJ1 to CJ3 correspond to the reception-side coils CJ1 to CJ6.

Eleventh Embodiment

In the configuration example of FIG. 1, the transmission power of the transmission-side coils CS1, CS2 and CS3 may be changed according to necessary power of each of power receivers (not shown). A method of changing the transmission power (eleventh embodiment) will be described by paying attention to the transmission-side coil CS1 in FIG. 1.

In the configuration example of FIG. 1, when the transmission-side switch SS1 is turned on, the voltage Vin applied across the voltage input terminals 8 and 9 is applied to the whole coil part of the transmission-side coil CS1. A tap A (not shown) is provided on the transmission-side coil CS1 and a switch A (not shown) is provided in series between the voltage input terminal 8 and the tap A in addition to the transmission-side switch SS1 so that the voltage Vin can be applied across the tap A and the voltage input terminal 9. The transmission-side switch change-over circuit 3 independently supplies a signal for turning on/off the switch A and the transmission-side switch SS1 to the switch A and the transmission-side switch SS1.

In the case of turning off the transmission-side switch SS1 and turning on the switch A, the voltage Vin is applied to the coil part between the tap A and the voltage input terminal 9 in the coil part of the transmission-side coil CS1. Consequently, the transmission power becomes smaller as compared with that in the case of turning on the transmission-side switch SS1 and turning off the switch A to apply the voltage Vin to the whole coil part of the transmission-side coil CS1.

Although the case where only one tap is provided on the transmission-side coil CS1 has been described above, in the case of switching the transmission power in three levels, it is sufficient to provide two taps. Similarly, the function of switching the transmission power in desired levels can be provided. The transmission-side coils CS2 and CS3 can be similarly constructed and can independently switch the transmission power. As the switch A, a transistor, a relay switch or the like can be used. The method of switching the transmission power can be applied to any of the first to tenth embodiments.

As described above, by providing the means capable of independently switching the transmission power of each of the plurality of transmission-side coils CS1, CS2 and CS3, power can be supplied optimally in accordance with power receivers of different kinds and whose necessary supply powers are different from each other. Information of necessary power of a power receiver to be charged may be transmitted by using magnetic coupling between the transmission-side coils CS1, CS2 and CS3 and the reception-side coils CJ1, CJ2 and CJ3 or by using the dedicated signal transmission coil CIJ and the dedicated signal reception coil CIS as shown in the second embodiment. Alternatively, the information may be transmitted by using means for transmitting the instruction signal S as shown in the third and fourth embodiments.

Twelfth Embodiment

Figure 11:
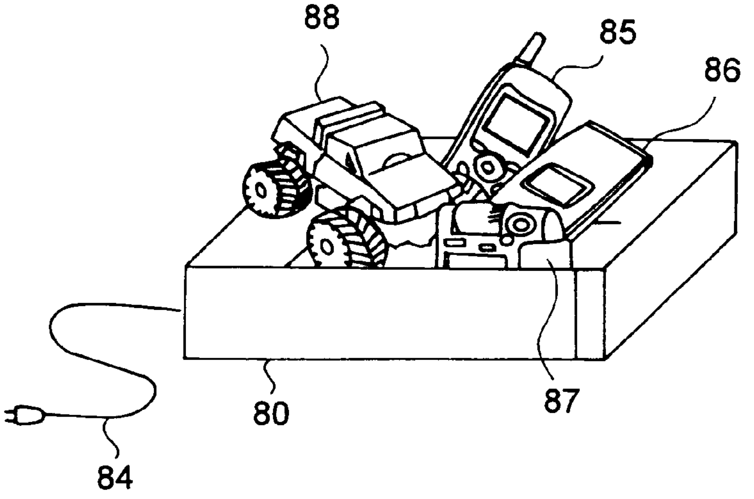
FIG. 11 is a schematic view showing a twelfth example embodiment of a power supply system.
Figure 12:
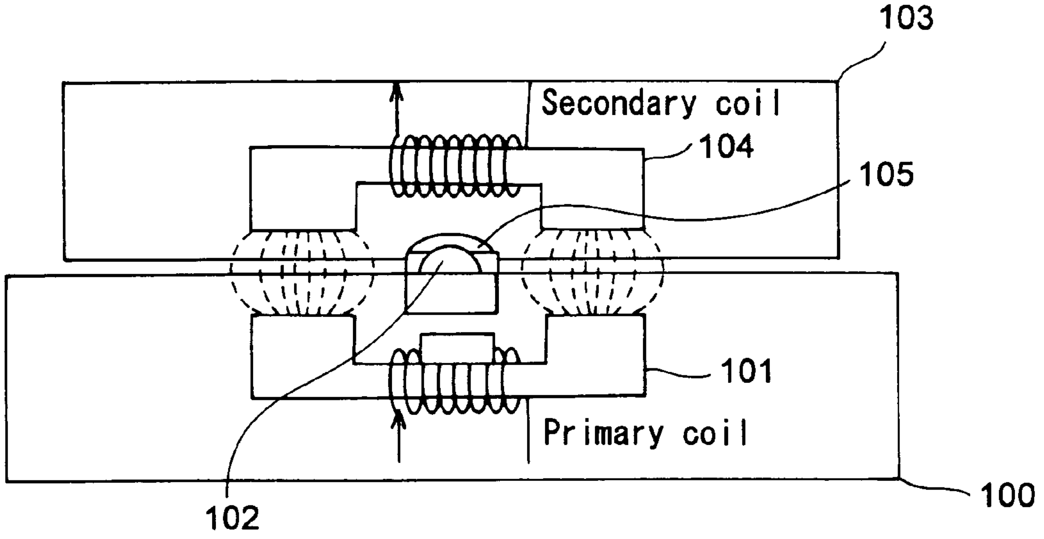
FIG.12 PRIOR ART

In a twelfth embodiment, a power supply system which can be applied to any of the first to eleventh embodiments will be described with reference to FIG. 11. FIG. 11 is a schematic view of the power supply system. A power transmission box 80 is obtained by combining the power transmission box 70 and the power transmission module 71 in FIG. 10. A power supply cord 84 is similar to the power supply cord 74 shown in FIG. 10. A power reception module similar to that in each of the first to eleventh embodiments (such as the power reception module 72 in FIG. 10, hereinafter, referred to as "power reception module 72") is attached to or provided in each of power receivers 85 to 88 housed in the power transmission box 80. It is assumed that necessary powers of the power receivers 85 to 88 are different from each other.

Between the power reception module 72 attached to the power receiver 85 and the power transmission module 71, operation similar to that in FIGS. 2 and 3 is performed. The determination circuit 7 of the power reception module 72 attached to the power receiver 85 transmits the instruction signal S to the transmission-side switch change-over circuit (transmission-side switch change-over circuit 3 or 33) of the power transmission module 71 and the reception-side switch change-over circuit (reception-side switch change-over circuit 5) of the power reception module 72 attached to the power receiver 85 (see step #12 in FIG. 2 or 3). With the configuration, power is supplied to the power receiver 85 with the combination between any of the transmission-side coils CS1 to CS6 and any of the reception-side coils CJ1 to CJ6 (which are provided on the power reception module 72 attached to the power receiver 85) of the highest power transmission efficiency.

Similarly, between each of the power reception modules 72 attached to the power receivers 86, 87 and 88 and the power transmission module 71, operation similar to that in FIGS. 2 and 3 is performed. Power is supplied in the combination between any of the transmission-side coils CS1 to CS6 and any of the reception-side coils CJ1 to CJ6 (which are provided on the power reception module 72 attached to each of the power receivers 86, 87 and 88) of the highest power transmission efficiency for each of the power receivers 86, 87 and 88.

Since necessary powers of the power receivers 85 to 88 are different from each other, desirably, the power transmission box 80 for transmitting power transmits necessary power to each of the power receivers 85 to 88. Consequently, the configuration in the eleventh embodiment is applied and, while the optimum combination between a reception-side coil (not shown) of each of the power receivers 85 to 88 and a transmission-side coil (not shown) of the power transmission box 80 is selected through the operation shown in FIG. 2 or 3, the power transmitted to each of the power receivers 85 to 88 is switched for each of the power receivers 85 to 88.

Therefore, the user casually disposes or puts a power receiver of a mobile phone, a notebook-sized personal computer, a digital camera, an electric shaver, an electronic toy, or the like, to/in which the power reception module of the present technology (for example, the power reception module 72) is attached or provided in the power transmission box 80 without caring the positional relation between the power receivers and the power transmission box 80, thereby automatically performing optimum charging simultaneously even though necessary powers of the power receivers are different from each other.

A power supply system can be constructed by combining the first to twelfth embodiments so long as no contradiction arises. The operation of the power supply system having any of the power transmission modules 1, 21, 31, 41, 51 and 71 and any of the power reception modules 2, 22, 32, 42 and 72 is similar to that shown in FIGS. 2 and 3.

"To provide the power reception module in the power receiver" corresponds to "attachment of the power reception module to the inside of the power receiver". Therefore, "to provide the power reception module in the power receiver" is a concept included in "attachment of the power reception module to the power receiver".

What is claimed is:

1. A power supply system capable of supplying power from a power transmitter to a power receiver in an electrically non-contact manner, comprising:

a power transmission module attached to the power transmitter; and a power reception module attached to the power receiver, wherein the power transmission module includes a plurality of transmission-side coils for transmitting power, a plurality of transmission-side switches for turning on/off operation of the transmission-side coils, respectively, and a transmission-side switch change-over circuit for selectively turning on one of the transmission-side switches, the power reception module includes:

one or more reception-side coils configured to receive power, one or more reception-side switches configured to turn on/off operation of the one or more reception-side coils, respectively, a memory configured to record a value of power energy received by the one or more reception-side coils, and a determination circuit configured to output an instruction signal to operate any of the transmission-side coils and any of the reception-side coils in combination realizing a highest power transmission efficiency on a basis of the value of power energy recorded on the memory, and wherein the instruction signal is transmitted to the transmission-side switch change-over circuit and, according to the instruction signal, the one or more reception-side switches are configured to turn on/off operation of the one or more reception-side coils.

2. The power supply system according to claim 1, wherein the power reception module includes a signal transmission coil configured to transmit the instruction signal, and the power transmission module includes a signal reception coil configured to receive the instruction signal.

3. The power supply system according to claim 2, wherein the signal transmission coil is wound around a core around which one of the reception-side coils is wound, and the signal reception coil is wound around a core around which one of the transmission-side coils is wound.

4. The power supply system according to claim 1, wherein a lead wire is provided between one end and another end of at least one each of the one or more reception-side coils provided in the power reception module and the transmission-side coils provided in the power transmission module, the instruction signal is transmitted in a part between the one end or the other end of the reception-side coil for which the lead wire is provided and the lead wire, and the instruction signal is received in a part between the one end or the other end of the transmission-side coil for which the lead wire is provided and the lead wire.

5. The power supply system according to claim 1, wherein the power transmission module comprises a sheet shape and has flexibility.

6. The power supply system according to claim 1, wherein the power reception module comprises has a sheet shape and has flexibility.

7. The power supply system according to claim 1, wherein the power reception module comprises a sheet shape and has flexibility and is attached to the power receiver so as to partially or completely cover the power receiver.

8. The power supply system according to claim 1, wherein the power transmission module comprises a sheet shape and has flexibility, the power reception module comprises a sheet shape and has flexibility, the power transmitter comprises a housing in which the power transmission module is adhered to or buried in a whole or part of an inner face, and the power reception module is provided inside the power receiver.

9. The power supply system according to claim 8, wherein the housing comprises an openable/closable cover, and the housing is shielded by being entirely or partially covered with a conductive material or made of a conductive material.

10. The power supply system according to claim 1, wherein the memory is configured to record the value of the power energy only when the value of power energy to be recorded is equal to or larger than a predetermined value.

11. The power supply system according to claim 1, further comprising:

an input device configured to receive a signal which makes the determination circuit output the instruction signal, wherein when the signal is received, the determination circuit is configured to determine the combination of any of the transmission-side coils and any of the reception-side coils realizing the highest power transmission efficiency and outputs the instruction signal to the transmission-side switch change-over circuit and the reception-side switch change-over circuit so as to operate the transmission-side coil and the reception-side coil in the combination realizing the highest power transmission efficiency.

12. The power supply system according to claim 1, wherein when a state where the power transmission efficiency is equal to or lower than predetermined efficiency continues for a predetermined time or longer, the determination circuit is configured to determine the combination of any of the transmission-side coils and any of the reception-side coils realizing the highest power transmission efficiency and to output the instruction signal to the transmission-side switch change-over circuit and the reception-side switch change-over circuit so as to operate the transmission-side coil and the reception-side coil in the combination realizing the highest power transmission efficiency.

13. The power supply system according to claim 1, wherein power transmitted from each of the plurality of transmission-side coils can be switched.

14. The power supply system according to claim 1, wherein as the power reception module, a plurality of power reception module are provided so as to be attached to a plurality of power receivers of which one is the power receiver, power can be supplied simultaneously to the plurality of power receivers, and the determination circuit of each of the power reception modules is configured to determine a combination of any of the transmission-side coils and any of the reception-side coils realizing the highest power transmission efficiency and to output the instruction signal to the transmission-side switch change-over circuit and the reception-side switch change-over circuit so as to operate the transmission-side coil and the reception-side coil in the combination realizing the highest power transmission efficiency.

* * * * *